US009521547B2

(12) United States Patent
Park et al.

(10) Patent No.: US 9,521,547 B2
(45) Date of Patent: Dec. 13, 2016

(54) METHOD FOR MANAGING EMBEDDED UICC AND EMBEDDED UICC, MNO SYSTEM, PROVISION METHOD, AND METHOD FOR CHANGING MNO USING SAME

(75) Inventors: Jaemin Park, Seoul (KR); Jinhyoung Lee, Seoul (KR)

(73) Assignee: KT CORPORATION, Seongnam-si (KR)

( * ) Notice: Subject to any disclaimer, the term of this patent is extended or adjusted under 35 U.S.C. 154(b) by 144 days.

(21) Appl. No.: 14/342,980

(22) PCT Filed: Sep. 4, 2012

(86) PCT No.: PCT/KR2012/007062
§ 371 (c)(1),
(2), (4) Date: Mar. 5, 2014

(87) PCT Pub. No.: WO2013/036009
PCT Pub. Date: Mar. 14, 2013

(65) Prior Publication Data
US 2014/0235210 A1    Aug. 21, 2014

(30) Foreign Application Priority Data

Sep. 5, 2011   (KR) .................. 10-2011-0089639
Oct. 7, 2011   (KR) .................. 10-2011-0102428

(51) Int. Cl.
*H04M 1/66* (2006.01)
*H04W 12/04* (2009.01)

(52) U.S. Cl.
CPC .................. *H04W 12/04* (2013.01)

(58) Field of Classification Search
CPC ...... H04W 12/06; H04W 12/04; H04W 88/02; H04W 76/00; H04W 4/24; H04W 8/183; H04W 76/02; H04W 84/047; H04W 24/02; H04W 8/205; H04L 63/061; H04L 63/0823; H04L 63/0853; H04L 2463/082; H04L 2463/061; H04L 9/0822; H04L 9/321; H04L 9/3271; H04M 15/7556; H04M 15/7655; H04M 15/773; H04M 17/026; H04M 15/751
(Continued)

(56) References Cited

U.S. PATENT DOCUMENTS 7,382,882 B1    6/2008   Immonen
7,512,796 B2    3/2009   Haverinen et al.
(Continued)

FOREIGN PATENT DOCUMENTS

EP    2 175 674 A1    4/2010
JP    2003-530012 A   10/2003
(Continued)

OTHER PUBLICATIONS

International Search Report for PCT/KR2012/007062 dated Jan. 30, 2013.
Written Opinion for PCT/KR2012/007062 dated Jan. 30, 2013.

*Primary Examiner* — Mahendra Patel
(74) *Attorney, Agent, or Firm* — Sughrue Mion, PLLC

(57) ABSTRACT

The present invention relates to profile access credentials used for encoding profiles in a system comprising an mobile network operator (MNO), a subscription manager (SM), an embedded UICC (eUICC) and the like, that is, a method for storing/managing an eUICC publication key and a corresponding secret or the like inside the eUICC. In addition, the invention also provides a method for transmitting information on profile access credentials inside the eUICC to external entities for encoding and the like.

13 Claims, 5 Drawing Sheets

(58) Field of Classification Search
USPC .......................................................... 455/411
See application file for complete search history.

(56) References Cited

U.S. PATENT DOCUMENTS

| | | | | |
|---|---|---|---|---|
| 2006/0040661 A1* | 2/2006 | Choi et al. | ................. | 455/432.3 |
| 2007/0298817 A1* | 12/2007 | Alfano | ................... | H04W 4/14 |
| | | | | 455/466 |
| 2009/0287922 A1* | 11/2009 | Herwono | ............. | H04L 9/0822 |
| | | | | 713/155 |
| 2009/0316690 A1* | 12/2009 | Kim | ....................... | H04L 12/66 |
| | | | | 370/352 |
| 2010/0062808 A1* | 3/2010 | Cha | .................... | G06Q 20/3229 |
| | | | | 455/558 |
| 2010/0232546 A1* | 9/2010 | Yu | ....................... | H04W 72/042 |
| | | | | 375/300 |
| 2011/0003590 A1* | 1/2011 | Yoon | .................. | H04W 36/385 |
| | | | | 455/432.1 |
| 2011/0314287 A1* | 12/2011 | Escott | .................. | H04L 63/061 |
| | | | | 713/171 |
| 2012/0002594 A1* | 1/2012 | Racz | ................. | H04B 7/15557 |
| | | | | 370/315 |
| 2012/0302284 A1* | 11/2012 | Rishy-Maharaj et al. | . | 455/552.1 |

FOREIGN PATENT DOCUMENTS

| | | | | |
|---|---|---|---|---|
| KR | 20060040661 A | * | 5/2006 | ......... H04L 63/0823 |
| KR | 10-2008-0077786 A | | 8/2008 | |

\* cited by examiner

METHOD FOR MANAGING EMBEDDED UICC AND EMBEDDED UICC, MNO SYSTEM, PROVISION METHOD, AND METHOD FOR CHANGING MNO USING SAME

TECHNICAL FIELD

The present invention relates to a method of managing key information of an embedded universal integrated circuit card (eUICC), an eUICC and a mobile network operator (MNO) system using the same, and methods of provisioning and MNO change using the same, more specifically to a method of managing and using an eUICC public key and key information for such the eUICC public key as profile access credentials which can be used for managing various profiles of the eUICC.

BACKGROUND ART

An Universal Integrated Circuit Card (UICC) is a smart card which can be used as a module for authentication of a user as inserted in a terminal. The UICC may store personal information of a user and operator information about a Mobile Network Operation (MNO) which the user subscribes to. For example, the UICC may include an International Mobile Subscriber Identity (IMSI) identifying the user. Also, the UICC may be referred to as a Subscriber Identity Module (SIM) card for Global System for Mobile communications (GSM), or a Universal Subscriber Identity Module (USIM) card for a Wideband Code Division Multiple Access (WCDMA).

When a user inserts a UICC into a terminal of the user, authentication of the user can be automatically performed by using the information stored in the UICC so that the user can conveniently use the terminal. Also, when a user desires to substitute an old terminal with a new terminal, the user can easily substitute the old terminal with the new terminal by inserting a UICC removed from the old terminal into the new terminal.

When terminals which are required to be miniaturized, for example, terminals for Machine-to-Machine (M2M) communications, are manufactured as having a structure for removable UICC, it becomes difficult to miniaturize the terminals. Therefore, an embedded UICC (eUICC), a non-removable UICC has been proposed. Information about a user using the eUICC is stored in the UICC in a form of IMSI.

Since a conventional UICC is implemented as a removable card, a user can open a terminal without a limit to types of terminals or MNOs. However, an IMSI in the eUICC of a terminal can be assigned when the terminal is used only for a specific mobile network operator designated in the manufacturing step of the terminal. Thus, an MNO placing an order for terminals and a manufacturer of the terminals should consider a stock inventory of manufactured terminals, and which becomes a reason of increasing sale prices of terminals. Also, users have inconveniency in changing a mobile network operator to which they subscribe to. Therefore, demanded is a method of opening a terminal by a user without regard to a mobile network operator of his terminal.

On the other hand, according to the recent introduction of the eUICC, it becomes necessary to update information about subscribers of various mobile network operators in a UICC remotely. Accordingly, a Subscription Manager (SM) or a Profile Manager (PM) for management of information about subscribers is being discussed.

It is being discussed that the SM is responsible for functions such as management of information about eUICC, information about various mobile network operators, authentication on change of mobile network operator, a remote information change, etc. However, details of the functions and roles of the SM has not been defined yet.

DISCLOSURE

Technical Problem

The present invention provides a method of managing information about profile access credentials of an eUICC.

The present invention also provides a method of managing key information about an eUICC public key as profile access credentials which can decrypt an encrypted profile.

The present invention also provides a method of managing a key of an eUICC in an environment in which a role of subscription manager (SM) is divided into a subscription manager-secure routing (SM-SR) and a subscription manager-data preparation (SM-DP).

The present invention also provides a method that an eUICC possesses and manages an encryption key (a public key or a secret key corresponding to the public key) used for a SM-SR to encrypt or decrypt security information in an environment in which a role of SM is divided into a SM-SR and a SM-DP.

The present invention also provides a method that an eUICC stores and manages profile access credentials used for accessing a profile (a provisioning profile, an operational profile, etc.), and transmits information about the profile access credentials to an external entity.

Technical Solution

An example embodiment of the present invention provides a method of managing key information of an embedded universal integrated circuit card (eUICC), performed in the eUICC interworking with external entities including a mobile network operator (MNO) system and a subscription manager (SM) system, wherein the eUICC performs a procedure of checking status and capability with at least one of the external entities, the eUICC provides information about its status and capability during the procedure of checking status and capability, and the information about its status and capability is key information including information about at least one of a key generation algorithm, a key length, and a key generation manner.

Other example embodiment of the present invention provides a method of provisioning, performed in an embedded universal integrated circuit card (eUICC) system including a mobile network operator (MNO) system, a subscription manager (SM), and an eUICC interworking with the MNO system and the SM, the method comprising receiving, by the MNO system, PKI key information about an eUICC public key which can encrypt a profile from the eUICC; encrypting, by the MNO system or the SM, the profile using the eUICC public key primarily; and transmitting, by the MNO system, the encrypted profile to the eUICC.

Other example embodiment of the present invention provides a method of provisioning, performed in an embedded universal integrated circuit card (eUICC) system including a mobile network operator (MNO) system, a subscription manager (SM), and an eUICC interworking with the MNO system and the SM, the method comprising: receiving, by the MNO system, PKI key information about an eUICC public key which can encrypt a profile from the eUICC;

encrypting, by the MNO system or the SM, the profile using the eUICC public key primarily; requesting, by the MNO system, a second encryption to the SM by transmitting the primarily encrypted profile to the SM, and receiving a secondarily encrypted profile from the SM in response to the request; and transmitting, by the MNO system, the secondarily encrypted profile to the eUICC.

Other example embodiment of the present invention provides a method of changing MNO, performed in an embedded universal integrated circuit card (eUICC) system including a mobile network operator (MNO) system, a subscription manager (SM), and an eUICC interworking with the MNO system and the SM, the method comprising: receiving, by a receiving MNO system, PKI key information about an eUICC public key which can encrypt a profile from the eUICC; encrypting, by the receiving MNO system or the SM, the profile using the eUICC public key primarily; notifying, by the receiving MNO system, a fact that an MNO is changed, to a donor MNO system, and being certificated; requesting, by the receiving MNO system, a second encryption to the SM by transmitting the primarily encrypted profile to the SM, and receiving a secondarily encrypted profile from the SM in response to the request; and transmitting, by the receiving MNO system, the secondarily encrypted profile to the eUICC.

Other example embodiment of the present invention provides an embedded universal integrated circuit card (eUICC) interworking with external entities including a mobile network operator (MNO) system and a subscription manager (SM) system, wherein the eUICC includes profile access credentials which can decrypt a profile transmitted from one of the external entities, and the eUICC provides key information which is information about its status and capability, and the key information includes information about at least one of a key generation algorithm, a key length, and a key generation manner.

Other example embodiment of the present invention provides an embedded universal integrated circuit card (eUICC) interworking with a mobile network operator (MNO) system and a subscription manager (SM) system, the eUICC comprising a chip operating system (COS), a SIM platform, a SIM service management platform, and a PKI key information profile which stores and manages key information about profile access credentials which can decrypt a profile transmitted from the MNO system or the SM.

Other example embodiment of the present invention provides a mobile network operator (MNO) system interworking with a subscription manager (SM) system and an embedded universal integrated circuit card (eUICC), wherein the MNO system receives PKI key information about an eUICC public key which can encrypt an eUICC profile needed for provisioning and MNO change from the eUICC during a procedure of provisioning and MNO change of the eUICC, encrypts the eUICC profile using the eUICC public key, and transmits the encrypted profile to the eUICC.

MODES OF THE INVENTION

Figure 1:
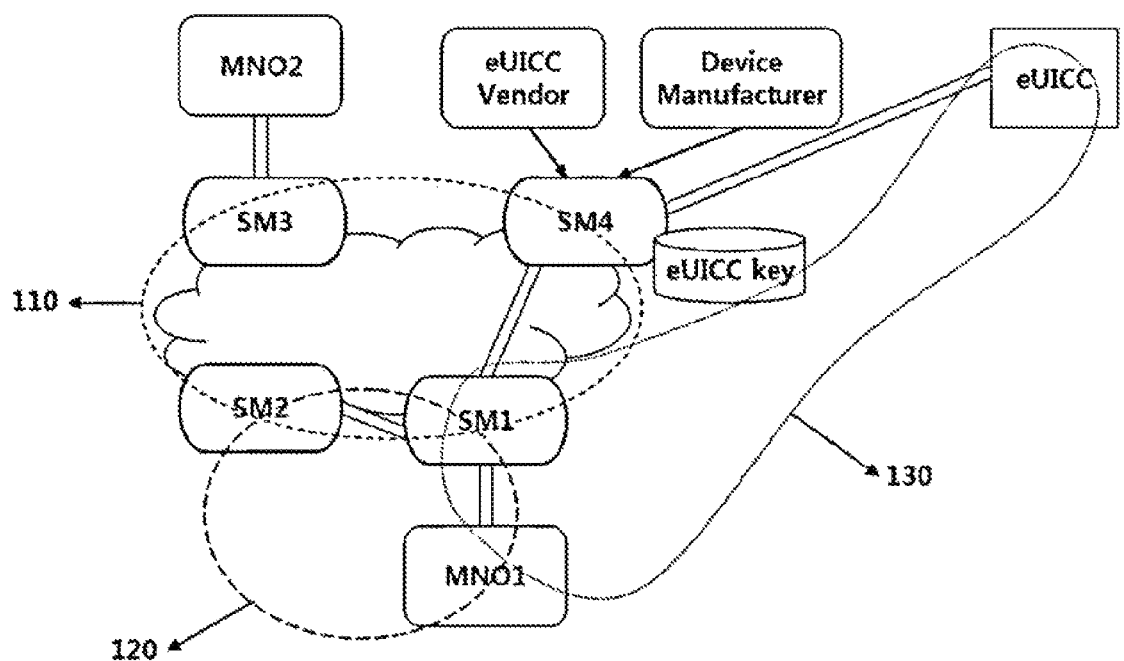
FIG. 1 illustrates an overall service architecture including an eSIM (eUICC) to which the present invention is applied.

Hereinafter, exemplary embodiments of the present invention will be described will be described with reference to the accompanying drawings. In the following description, the same elements will be designated by the same reference numerals although they are shown in different drawings. Furthermore, in the following description of the present embodiment, a detailed description of know functions and configurations incorporated herein will be omitted when it may make the subject matter of the present embodiment unclear.

A Machine-to-Machine (M2M) terminal which is being discussed currently in a Global Systems for Mobile communications association (GSMA) should have a small size according to its characteristic. However, when a conventional UICC is used for the M2M terminal, a module for installing the UICC in the M2M terminal should be prepared separately. Thus, miniaturization of the M2M terminal becomes difficult if the M2M terminal is manufactured in a form having a structure of a removable UICC.

Therefore, a structure of an embedded UICC (eUICC) which is non-removable is being discussed. In this case, information about a mobile network operator (MNO) using the eUICC should be stored in the eUICC in a form of International Mobile Subscriber Identity (IMSI).

However, an IMSI in the eUICC of a terminal can be assigned when the terminal is used only for a specific mobile network operator designated in the manufacturing step of the terminal. Thus, an MNO placing an order for terminals and a manufacturer of the terminals should consider a stock inventory of manufactured terminals, and which becomes a reason of increasing sale prices of terminals. These problems are being big obstacles to expanding bases of M2M terminals.

As described above, as opposed to the conventional removable SIM, an embedded SIM (hereinafter, referred to as 'eSIM' or 'eUICC') has many issues such as an authority of opening, an initiative on value-added services, security of subscriber information, and so on. For these, international standardization organizations such as a GSMA and a European Telecommunication Standards Institute (ETSI) are performing standardization on necessary elements including top structures by interworking with related entities such as operators, manufacturers, SIM vendors, etc. A subscription manager (SM) is being focused upon in the standardization organizations as a main issue of the standardization on the eSIM. The SM means an entity or a function/role of performing overall managements on the eSIM such as issuing important profiles (referred to as 'Operator Credentials', 'MNO Credentials', 'Profile', 'eUICC Profile', 'Profile packages', etc.), and processing a procedure of subscription change, etc.

Recently, the GSMA proposed a structure in which the SM is divided into a SM-Data Preparation (SM-DP) performing a role of generating operator information and a SM-Secure Routing (SM-SR) performing a role of direct delivery of the operator information. However, detail, technical, and actual issuing mechanism has not been mentioned.

Therefore, in the present invention, a method of managing eSIM using generation of a dynamic encryption key (such as a public key, etc.) is proposed in the above described environment of separated roles of SM defined in the GSMA.

In this specification, the terminologies 'eSIM' and 'eUICC' are used as an identical concept.

The eSIM is a technology of SIM having a new concept. In a step of manufacturing a terminal, an IC chip is attached on a circuit board of the terminal, and SIM data (such as information about opening, value-added services, etc.) in a form of software are issued via Over-The-Air (OTA) or offline interface (such as connection with a PC based on a universal serial bus (USB), etc.). The IC chip used for the eSIM generally supports a hardware-based Crypto Co-Processor (CCP), generates a hardware-based public key, and provides application programming interfaces (API) which can be utilized by an application (for example, applet) to a SIM platform (for example, Java card platform, etc.). The Java card platform is one of platforms in which multiple applications are installed and which provides service in a smart card.

Due to a restricted memory space of the IC chip and security issues, applications cannot be installed by everyone in the SIM. Accordingly, a SIM service management platform for installation and management of applications in the SIM is needed in addition to the platform of applications. The SIM service management platform may issue data in a memory region of the SIM through authentication and security using a management key. A GlobalPlatform, a Remote File Manager (RFM), and a Remote Application Manager (RAM) which are specified in ETSI TS 102.226 are standard technologies for the SIM service management platform.

The SM, one of important elements of an eSIM environment, acts a role of remotely issuing data of communication and value-added services through a management key (such as a UICC OTA key, a Global Platform Issuer Security Domain (GP ISD) key, etc.).

Here, the management key (an eSIM management key or an eUICC management key) is used to deliver operator information securely to the eSIM as an access authentication key, and differentiated from an encryption key (a public key, etc.) which is mainly described in the present invention. The management key may also be represented as 'eUICC access credentials' which will be explained later.

In the GSMA, a role of the SM is classified into a SM-DP and a SM-SR. The SM-DP may perform a role of safely building an operation profile (or, operator information), IMSI, K, OPc, value-added service applications, and value-added service data and making a credential package for them. The SM-SR may perform a role of downloading safely the credential package generated by the SM-DP to the eSIM via SIM remote management technologies such as an OTA, a GP Secure Communication Protocol (GP SCP), etc.

Also, a structure of a 'Circle of Trust' shown in FIG. 1, which has a concept that an end-to-end trusted relation between an MNO and an eSIM is established based on overlapped trusted relations between each similar entity and entities, has been proposed. That is, a first MNO (MNO1) forms a trusted relation with a first SM (SM1), the first SM (SM1) forms a trusted relation with a fourth SM (SM4), and the fourth SM (SM4) forms a trusted relation with the eSIM. Accordingly, the trusted relation between the MNO and the eSIM may be established.

Before explaining the present invention, terminologies used in this specification are explained.

A 'MNO' means a mobile network operator, an entity providing mobile communication services to its customers through mobile networks.

Also, a 'SM' means a subscription manager, and performs a function of managing an eUICC.

Also, an 'eUICC supplier' means a provider of an eUICC module and resident software (such as a firmware, an operating system, etc.).

Also, a 'device vendor' means a provider of devices (that is, terminals) which require an UICC (or, an eUICC), especially, devices including a function of a wireless modem for a mobile network operated by an MNO.

Also, a 'provisioning' means a procedure of loading a profile into an eUICC, and a provisioning profile means a profile used for a device to access a communication network for the purpose of provisioning other provisioning profiles or operational profiles.

Also, a 'subscription' means a commercial relationship between a subscriber and a mobile communication service provider (an MNO) providing services to the subscriber.

Also, 'eUICC access credentials' mean data in an eUICC, used for setting up secured communications between the eUICC and an external entity to manage profiles in the eUICC.

Also, 'profile access credentials' mean data in a profile or the eUICC, used for setting up secured communications between the eUICC and an external entity to protect or manage a profile structure and data of the profile.

Also, a 'profile' means all information which can exist in the eUICC, a file structure which can be provisioned to the eUICC, or managed in the eUICC, combinations of data and applications. The profile may include an operational profile (that is, operator information), a provisioning profile (a profile for provisioning), a profile for other policy control functions (PCF), and so on.

Here, an 'operational profile' or 'operator information' means all kinds of profiles related to an operational subscription.

FIG. 1 illustrates an overall service architecture including an eSIM (eUICC) to which the present invention is applied.

The entire system may be explained as follows.

An eUICC system architecture to which the present invention is applicable may comprise a plurality of MNO systems, at least one SM system, an eUICC vendor system, a system of a manufacturer of a device equipped with an eUICC, and an eUICC. Explanations on each entity are as follows.

In FIG. 1, a dotted line represents a circle of trust, and a line comprising two full lines means a secured link.

If a scenario in which subscription information is stored and delivered is needed, it should be performed under authorization of an MNO and control of the MNO. Only one active profile should exist in a single eUICC at a certain time. At this time, the active profile means a profile added to a single HLR at the certain time.

An MNO and an eUICC should be able to decode MNO credential information, that is, profiles (an operational profile, a provisioning profile, etc.). The only exception for this may be a third party organization trusted by a specific MNO, for example, a SIM vendor. However, it is not a general function of the third party organization for performing the function.

A subscription cannot be switched in an eUICC when it is out of an operational policy control. A user should know any change in an MNO context and its activated subscription, be able to avoid a security danger, and require a security level up to a degree of competing with a current UICC model.

MNO credentials or a profile may mean subscription credentials including K, an algorithm, parameters for an algorithm, a value-added service application, value-added service data, etc.

A delivery of the MNO credentials or the profile should be performed from end to end in a secured manner. The delivery may be performed with continuous steps which do not break a security chain, and all the steps in the delivery chain should be performed under identification and authorization of an MNO. Although any entities in the delivery chain should not be able to identify the MNO credentials, the only exception is a third party organization trusted by a specific MNO, for example, a SIM vendor. However, it is not a general function of the third party organization.

An operator should have a complete right in controlling its credentials, and have strong rights in directing and controlling SM operations.

The SM functions should be provided by an MNO or a third-party organization. If they are provided by a third-party organization, there may be a commercial relationship between the SM and the MNO.

For managing subscriptions, the SM does not have any direct relationships with subscribers of an MNO. Although an MNO is required to have relationships with subscribers and to be an entry point for customer subscription, it is intended that the MNO go along with a contact between a M2M service provider (that is, a subscriber of the MNO) and customers of the M2M service provider.

When MNOs are being swapped, a donor MNO and a receiving MNO may have a previously made contract or not. A mechanism for approving the previous contract is necessary. A function of policy control of the donor operator may define a condition for removing it credentials, and a policy control function (PCF) may implement such the function.

The architecture introduces a function defined as a SM, and a main role of the SM is preparing a package or a profile including MNO credentials and delivering it to an eUICC. The function of a SM may be provided directly by an MNO. Or, an MNO may make a contract with a third-party organization in order to obtain a SM service.

A role of the SM may be divided into two sub functions such as a SM-SR and a SM-DP.

Actually, the functions of SM-SR and SM-DP may be provided by different entities or a single entity. Therefore, a boundary between the functions of SM-SR and SM-DP is required be set clearly, and interfaces between the two entities are required to be defined.

The SM-DP may be responsible for securely preparing a package or profile to be delivered to an eUICC, and interwork with the SM-SR for actual transmission of the package or profile. The core functions of the SM-DP are as follows. In addition to the following functions, additional functions may be added later.

1) Managing functional characteristics and certification level of an eUICC

2) Managing MNO credentials and profiles (for example, they include at least one of IMSI, K, additional service applications, and additional service data. Also, some of them may be enciphered by an MNO.)

3) Calculating an OTA package for downloading by the SM-SR

If the functions of the SM-DP are provided by a third-party organization, security and trusted relationship may become more important. In addition to a function of a real-time provisioning, the SM-DP may have a function of background processing to a not inconsiderable extent. Also, it is predicted that requirements on performance, scalability, and reliability of the SM-DP become more important.

The SM-SR may be responsible for a role of routing and delivering the credential package to a corresponding eUICC safely. The core functions of the SM-SR are as follows.

1) Managing OTA communications with an eUICC through a ciphered virtual private network (VPN)

2) Managing communication with another SM-SR to form an end-to-end path to an eUICC 3) Managing eUICC data used for SM-SR OTA communications provided by an eUICC supplier 4) Protecting communications with an eUICC by filtering only allowed entities (that is, a function of fire wall)

A SM-SR database may be provided by an eUICC vendor, a device (such as a M2M terminal, etc.) vendor, and, potentially, an MNO, and may be used by an MNO through a SM-SR mesh network.

The circle of trust may enable an end-to-end secured link during the delivery of a provisioning profile, and the SM-SR may share the circle of trust for a safe routing of the provisioning profile and an eUICC discovery. An MNO may be linked to SM-SR and SM-DP entities in the circle of trust, or, the MNO may provide these functions autonomously. In order to prevent an illegal use of an eUICC (such as cloning, illegal uses of credentials, service denying, illegal MNO context change, etc.) without violation of duties based on contracts or regulations, a secured end-to-end link between an eUICC and MNO credential is required.

That is, in FIG. 1, a notation 110 may represent a circle of trust formed between SMs, more specifically a circle of trust formed between SM-SR members, and a notation 120 may represent a circle of trust between MNO partners, and a notation 130 may represent an end-to-end secure link.

Figure 2:
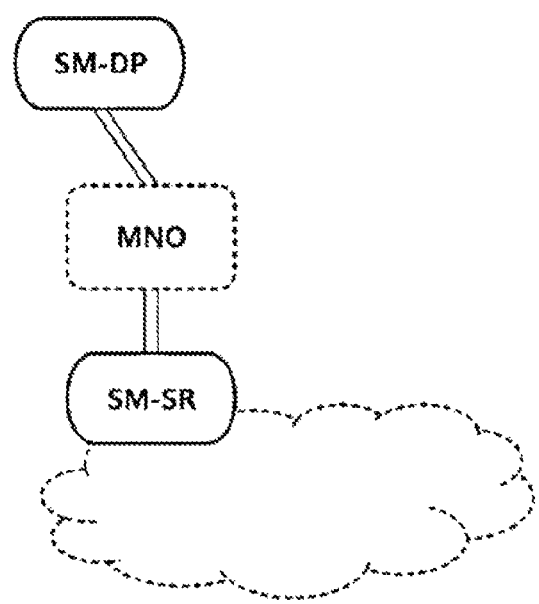
FIG. 2 illustrates a configuration in which a SM-SR and a SM-DP are located in a system, in an environment in which a role of SM is separated.

FIG. 2 illustrates a configuration in which a SM-SR and a SM-DP are located in a system, in an environment in which a role of SM is separated.

As shown in FIG. 2, a SM may be divided into a SM-DP which safely prepares various profiles related to an eUICC (such as an operational profile of an MNO, a provisioning profile, etc.) and a SM-SR for routing them. Also, the SM-SR may interwork with other multiple SM-SRs with trusted relationships, and the SM-DP may interwork with an MNO system.

Of course, arrangement of the SM-DP and the MNO system may be implemented differently from the case of FIG. 2. That is, the SM-DP may interwork with the SM-SR, and the MNO system may interwork with the SM-DP.

Under the above described eUICC system architecture, an eUICC according to an example embodiment of the present invention may comprise a mechanism of guaranteeing integrity, confidentiality, and authenticity for loading various profiles (such as a provisioning profile, an operational profile, etc.). As an example of the mechanisms, an encoding/decoding mechanism using a public key and a private key of an eUICC as profile access credentials and an electronic signature mechanism using a public key and a private key of a SM may be included selectively.

In other words, various profiles should be protected very safely in an eUICC architecture through a safe mechanism which can guarantee integrity, confidentiality, and authenticity. Accordingly, a safe mechanism for protecting the profiles is needed since the profiles are transmitted to an eUICC (not provisioned in a manufacturing step).

An eUICC according to an example embodiment of the present invention may manage or handle various profiles (such as a provisioning profile, an operational profile, etc.) by using profile access credentials in the eUICC.

More specifically, in the present invention, an eUICC have at least one set of profile access credentials (for example, a public key of an eUICC, etc.) for securely provisioning various profiles transmitted from an end point (for example, a SM) such as a provisioning profile, an operational profiles, etc. Also, the eUICC may decode a ciphered profile transmitted by an external entity by using the profile access credentials, as will be explained in a following example embodiment.

In addition, in an example embodiment of the present invention, only a single active profile is preferred to exist in an eUICC. A profile or profile management data should be transmitted between an end point reliably connected to an operating system having the profile or the profile management data and an eUICC. Also, the profile of the profile management data cannot be accessed by an external entity such as a device or a terminal. For this, in an example embodiment of the present invention, a method using an eUICC public key as profile access credentials, which can encode/decode the profile of the profile management data, is included.

In the specification, profile access credentials mean data used for decoding a profile received from an external entity such as a SM or an MNO, and is not limited to the terminology. That is, it may be represented using a different terminology such as profile installation credentials, profile installer credentials, etc. which can perform the same function.

Figure 3:
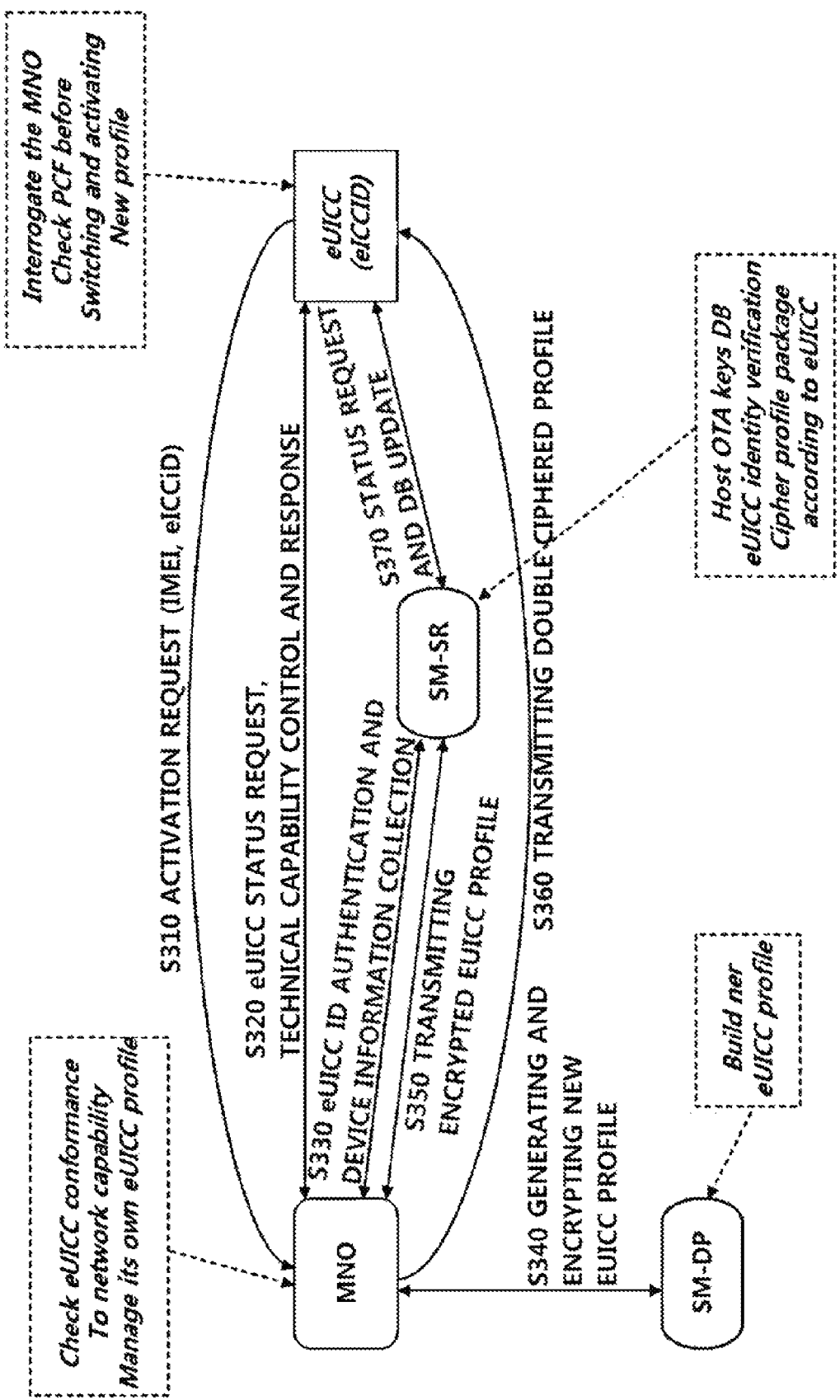
FIG. 3 is a flow chart to explain a provisioning procedure corresponding to a first subscription in a system to which the present invention is applied.

FIG. 3 is a flow chart to explain a provisioning procedure corresponding to a first subscription in a system to which the present invention is applied.

In the provisioning procedure, an eUICC may transmit an activation request including device identification information (such as IMEI, etc.) and eUICC identification information (such as eICCid, etc.) to an MNO (at S310). Then, a request of an eUICC status and request/confirmation of a technical capability control are performed (at S320).

Also, although not illustrated in FIG. 3, a step, in which the eUICC provides its public key (PK) or key information of PKI (information about a key generation algorithm, a key length, a key generation manner, etc.) to a corresponding MNO system or a SM-SR, may be included in the step S320.

In the step S330, the MNO may verify an identity of the eUICC and collect information about the eUICC by cooperating with the SM-SR. In the step S330, the MNO may obtain an encryption key for the eUICC, specifically, a public key corresponding to the eUICC from the SM-SR.

The obtaining the public key may be performed statically or dynamically. When the obtaining is performed statically, a public key and a private key can be generated in the eUICC in the manufacturing step of the eUICC. Specifically, a CCP in the eUICC may generate the public key and the private key. The private key may be stored in the eUICC, and the public key may be shared by all SM-SRs so that all the SM-SRs can recognize the public key for the eUICC and a SM-SR corresponding to the eUICC can transmit the public key for the eUICC to the MNO in response to a request of the MNO.

The dynamic procedure of obtaining the encryption key, which will be explained by referring to FIGS. 8 and 9, is that a SM-SR requests the eUICC to transmit a public key when there is a request (including identification information of the specific eUICC) from an MNO. In this case, the eUICC may generate the public key by using an issuance processing module in a terminal equipped with the eUICC and a security module in the eUICC, and transmit the generated public key to the SM-SR. Here, the issuance processing module may be also referred to as a communication module, a provisioning module, an issuance module, an opening module, etc. without being limited to a specific terminology. That is, the issuance processing module may perform a role of communicating with the outside of the terminal and management of a provisioning. Also, the security module may be also referred to as an encryption key generation module, an encryption key processing module, a security policy module, a credential manager, a profile manager, and so on. That is, the security module may perform generation of an encryption key and a security computation using the encryption key. The above procedure will be explained in further detail in the following description.

Here, a single security module may be commonly installed in the eUICC in the manufacturing step of the eUICC or later according to an eUICC policy. Alternatively, according to an eUICC policy and a policy of each MNO, multiple security modules may be installed for each MNO.

The MNO which has obtained the public key (the encryption key) of the corresponding eUICC may generate a new eUICC profile corresponding to the MNO through the SM-DP, encrypt the profile using the obtained public key, and deliver the encrypted profile to the MNO (at S340; a first encryption step). At this time, the SM-DP may generate an additional electronic signature by using its private key in order to provide authenticity. That is, the SM-DP may make an electronic signature on the profile by using its private key for authentication (at S340).

Then, the MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S350).

Then, the MNO may transmit the double ciphered eUICC profile to the corresponding eUICC (at S360). At this time, the public key of the SM-DP or a certification may be transmitted to the eUICC with the eUICC profile in order to provide authenticity.

Since the eUICC already knows the eUICC management key, the eUICC may completely decode the profile to be used for a provisioning by performing a second decoding using the private key corresponding to its public key after the first decoding. The private key is already known in the manufacturing step or from the dynamic generation procedure as explained above. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

It the step S370, the SM-SR database may be updated based on status requests and corresponding responses between the eUICC which finished the provisioning and the SM-SR.

Main configurations for the above-described steps are explained as follows.

In the step S310, the eUICC identification information (eICCid, etc.) is open data, and integrated and protected in the eUICC.

In the steps S320 and S330, the status request and the technical capability control may provide verification on the eUICC identity (that is, verification on whether the eUICC is trustable or not), and should be able to verify a feasibility of a characteristic of the eUICC for an MNO service.

In the steps S340 to S360, a double ciphering mechanism is used for generating and transmitting the eUICC profile. In other words, the profile which is linked to the eUICC by the SM-DP is ciphered by a ciphering mechanism which can be read by the target eUICC. Also, an electronic signature may be made by the SM-DP for verifying that the profile has been generated by the right SM-DP. Also, the SM-SR may encrypt the generated profile using the eUICC management key so as to authenticate and protect the profile during delivery.

In the step 370, the SM-SR database may be updated at a final stage of the subscription installation.

Figure 4:
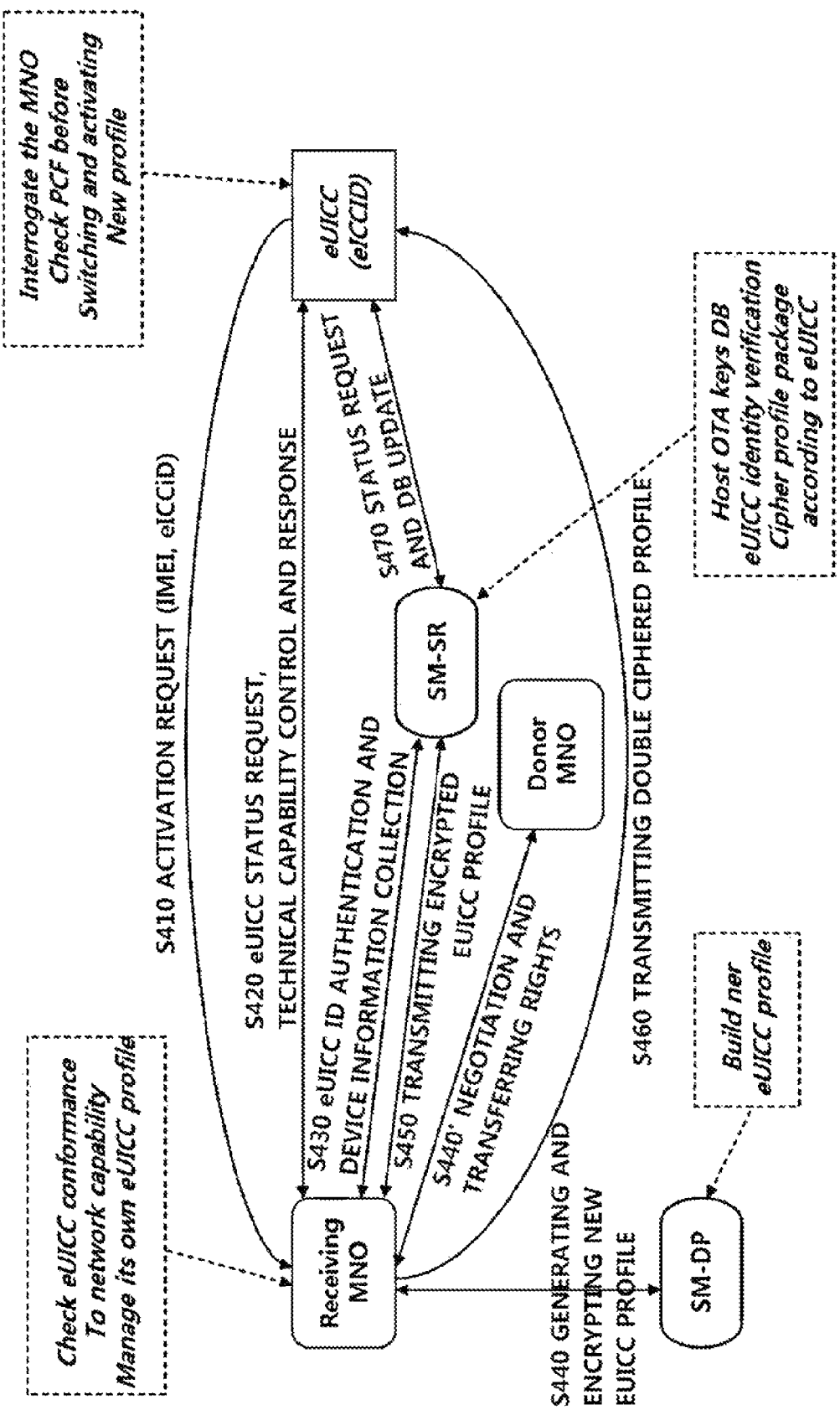
FIG. 4 is a flow chart explaining a procedure for subscription change or MNO change to which the present invention is applied.

FIG. 4 is a flow chart explaining a procedure for subscription change or MNO change to which the present invention is applied.

Generally, the procedure of FIG. 4 is similar to the provisioning procedure of FIG. 3. That is, a new MNO of FIG. 4, after changed, corresponds to an MNO of FIG. 3. The difference between two procedures is that the new MNO performs a procedure of negotiating and transferring right with a donor MNO before or after generation of a profile for the new MNO (at S440').

That is, the difference between an MNO change procedure of FIG. 4 and the provisioning procedure of FIG. 3 is that an activation request is transmitted using a provisioning profile or an operational active profile through a donor MNO OTA bearer, and the new MNO requests a path from the SM-SR in order to download a new profile through one of OTA and OTI.

The MNO change procedure of FIG. 4 is explained in detail as follows.

For changing an MNO, an eUICC may transmit an activation request including device identification information (IMEI, etc.) and eUICC identification information (eIC-Cid, etc.) to a receiving MNO which is to be changed (at S410). Then, an eUICC status request and a technical capability control are performed between the receiving MNO and the eUICC (at S420).

Also, even though not illustrated in FIG. 4, in the step S420 which will be explained in the following, a procedure in which the eUICC may provide its public key (PK) or PKI key information (such as a key generation algorithm, a key length, a key generation manner, etc.) which is profile access credential information, to the corresponding MNO system or the SM-SR may be included. This is similar to the provisioning procedure S320.

In a step S430, the receiving MNO may perform an eUICC identity verification and collect information about the device (eUICC) by interworking with the SM-SR. Also, according to an example embodiment of the present invention, the MNO may obtain an encryption key for the corresponding eUICC, specifically, a public key corresponding to the eUICC from a SM-SR.

The obtaining the public key may be performed statically or dynamically. When the obtaining is performed statically, a public key and a private key can be generated in the eUICC in the manufacturing step of the eUICC. Specifically, a CCP in the eUICC may generate the public key and the private key. The private key may be stored in the eUICC, and the public key may be shared by all SM-SRs so that all the SM-SRs can recognize the public key for the eUICC and a SM-SR corresponding to the eUICC can transmit the public key for the eUICC to the MNO in response to a request of the MNO.

The dynamic method of obtaining an encryption key is identical to the method which was explained by referring to FIG. 3. Thus, a redundant explanation is omitted.

The receiving MNO which obtained the public key (the encryption key) of the corresponding eUICC generates a new eUICC profile corresponding to the MNO through the SM-DP, encrypts the profile by using the obtained public key (the encryption key), and delivers the profile to the MNO (a first encryption; S440). At this time, the SM-DP may generate an additional electronic signature using its private key in order to provide authenticity. That is, in the step S440, the SM-DP may make an electronic signature on the profile by using its private key or secret key for authentication.

Also, a step S440' of negotiating and transferring right may be performed before or after the step S440. This step S440' is a procedure in which the receiving MNO requests the previous MNO (the donor MNO) to verify whether the eUICC is right or not and to transfer rights (information) according to the change of MNO.

In other words, in the step S440', the new receiving MNO may request authentication on the donor MNO for the subscription switching, and this authentication may be provided through a policy control function.

Then, the receiving MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S450).

Then, the MNO may transmit the double ciphered eUICC profile to the corresponding eUICC (at S460). At this time, the public key of the SM-DP or a certification may be transmitted to the eUICC with the eUICC profile in order to provide authenticity.

Since the eUICC already knows the eUICC management key, the eUICC may completely decode the profile to be used for change of MNO by performing a second decoding using the private key corresponding to its public key after the first decoding. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

In the step S470, the SM-SR database may be updated based on status requests and corresponding responses between the eUICC which finished the provisioning and the SM-SR.

On the other hand, for both the cases (the case in which a pair of the public key and the private key is generated in a manufacturing step of the eUICC and is utilized continuously during a lifecycle of the eUICC in order to issue operator information safely to the eUICC, and the case in which the public key and the private key are generated by the eUICC dynamically), various usable PKI techniques are available. Also, since various key lengths and key generation methods are available even for a same PKI technique, a detail mechanism, for storing such information in an eSIM and transmitting it to an MNO when it is needed, is necessary.

In an example embodiment of the present invention, a method in which an eUICC manages the public key and the secret key (the private key) used for encrypting an eUICC profile is proposed. That is, the present invention proposes a method in which various PKI techniques are applied to the environment of separated SM roles proposed by the GSMA, and in which PKI key generation is performed in the manufacturing step of the eUICC.

In an example embodiment, a pair of PKI keys are generated based on various PKI techniques (e.g. RSA, ECC, DH, etc.) in a manufacturing step of the eUICC by a SIM vendor, and detail information about the generated PKI keys (hereinafter, referred to as 'PKI key information') is stored in the eUICC. Also, the public key and the secret key may be generated dynamically by using an issuance processing module or a security module in a terminal. In this case, PKI key information for the generated PKI key also should be stored in the eUICC safely.

In the present specification, the PKI key information may include information about at least one of key generation algorithm, key length, and key generation manner. However, the PKI key information is not limited to the above described examples. That is, the PKI key information may mean all related information as well as the public key and the secret key generated by the PKI.

A format of PKI itself or PKI key information stored in the eUICC may be a file format such as Elementary File (EF), a file structure format such as a Tag, Length, Value (TLV), or an application format such as an applet. That is, the format of stored information is not limited to a specific format.

Also, the PKI itself or PKI key information may be stored in the eUICC in a profile form. In this case, the profile related to the PKI may be represented as a key information profile, an administration profile, a common profile, a general profile, etc. However, a terminology for the profile is not limited to the above examples. Hereinafter, the profile is referred to as 'key information profile'.

Figure 5:
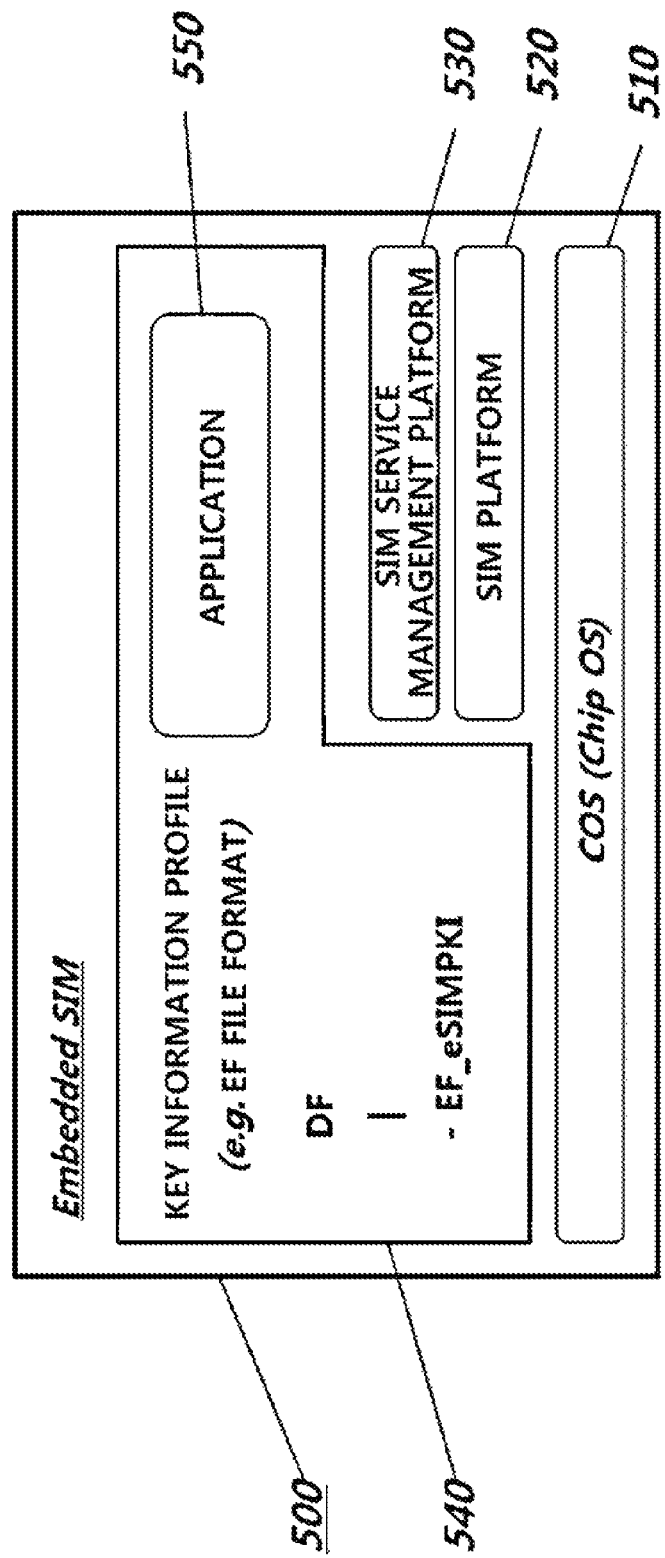
FIG. 5 illustrates an internal structure of an eUICC according to an example embodiment of the present invention.

FIG. 5 illustrates an internal structure of an eUICC according to an example embodiment of the present invention.

The eUICC 500 according to an example embodiment of the present invention may be included in a device or a terminal as being non-removable, and may include an chip operating system (COS) 510 of the lowest level, a SIM platform 520 of a level over the COS level, a SIM service management platform 530 over the SIM platform level, etc. Also, a PKI key information profile 540 according to the present invention may exist on the COS.

Although the key information profile 540 is illustrated as stored in an EF-type key information profile format such as EF_eSIMPKI in FIG. 5, as described above, the format is not limited to such the specific format. For example, the key information profile 540 may adopt a file structure format such as a Tag, Length, Value (TLV), or an application format such as an applet.

The PKI key information or key information profile stored in the eUICC may include, for example, key generation manners such as ALG_RSA/ALG_RSA_CRT/ALG_DSA and key length information such as 1024 bits, 2048 bits, etc. However, the information is not limited to the above examples.

Also, an application 550 having a specific function may be installed on the SIM service management platform 530, and the application may perform a function of extracting key information profile and transmitting it to an external entity (e.g. an MNO system). Also, the application itself may store and manage a key information profile according to the present invention.

Also, although not depicted in FIG. 5, a provisioning profile, operator information or operational profiles for each operator, and a security module corresponding to them may be included in the eUICC 500 according to the present invention. The operational profile and the security module may be included separately for each operator or MNO. However, at a certain time, it is preferable that only a single operational profile is activated.

Also, a provisioning profile 524 may exist in the eUICC 500, so that all MNOs can communicate with a device equipped with the eUICC and eUICC infra (such as a SM, an MNO, etc.) based on the corresponding provisioning profile. Also, information about an eUICC management key managed by a SM-SR (for example, the information may include an UICC OTA key, a GP ISD key, etc. However, the information is not limited to the above examples) may be stored in the eUICC.

An operation of the eUICC according to an example embodiment of the present invention is based on flows depicted in FIGS. 3 and 4.

In the steps S320 and S420 of FIGS. 3 and 4, an MNO system may request key information to a key information profile managing PKI key information in the eUICC. At this time, the MNO system may obtain the PKI key information according to the present invention by reading, for example, EF_eSIMPKI or selecting and driving a specific application to request data (that is, the PKI key information).

Based on the information obtained through the above-mentioned method, the (receiving) MNO system may identify which public key generation algorithm or manner is used for generating the eUICC public key obtained through the SM-SR and the like in the steps S330 and S430 of FIGS. 3 and 4. Also, based on the information, the MNO system may encrypt a necessary profile with the eUICC public key through the SM-DP and the like in the steps S340 and S440.

Figure 6:
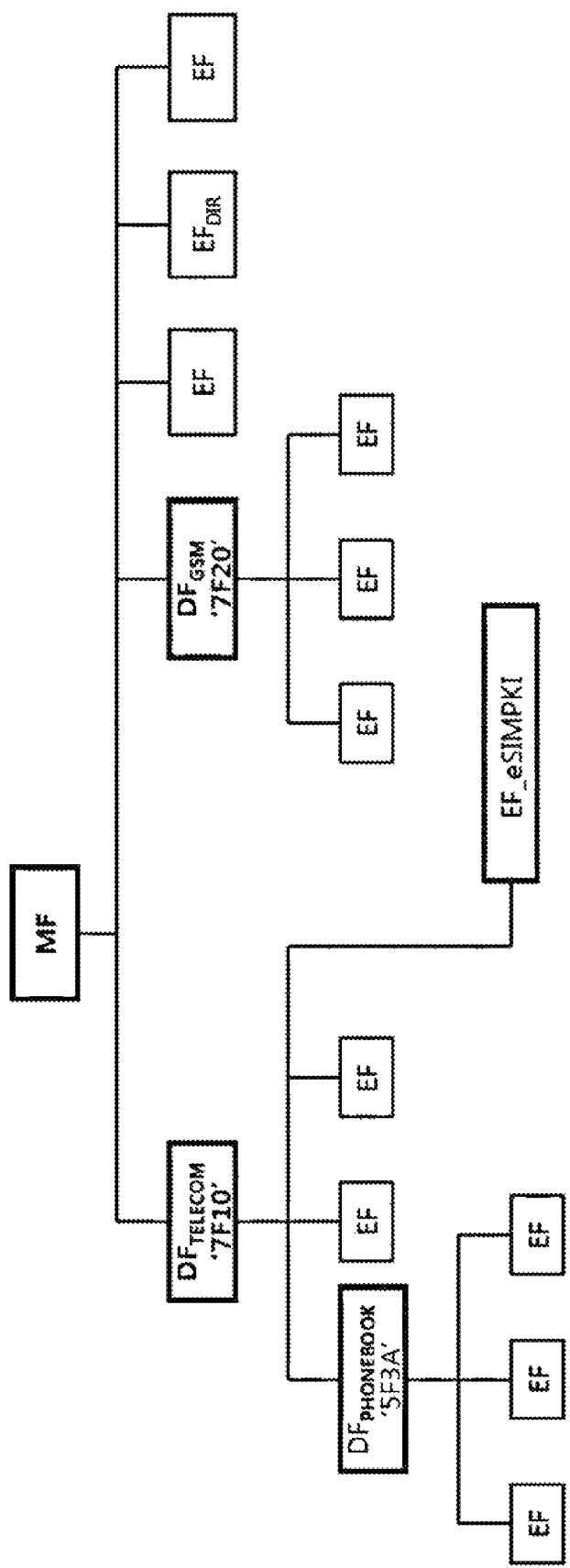
FIG. 6 illustrates an example of a file structure of an eUICC which is applied to an example embodiment of the present invention.

FIG. 6 illustrates an example of a file structure of an eUICC which is applied to an example embodiment of the present invention.

As shown in FIG. 6, formats of files stored in an eUICC or an eSIM according to an example embodiment of the present invention may be generally classified into a master file (MF), a dedicated file (DF), and an elementary file (EF).

The MF may include access condition, and may mean a mandatory file which can include DFs and EFs selectively.

The DF may be a file which enables functional grouping on files, become a parent file of DFs and/or EFs, and be referred by a file identifier.

Some file identifiers are reserved for specific uses. For example, an identifier for DFTELECOM among DFs may be configured as '7F10', and an identifier for DFGSM among DFs may be configured as '7F20'. Among these, the DFTELECOM may be used optionally, and include application-independent information.

Also, among DFs, a DFPHONEBOOK located below the DFTELECOM '7F10' has an identifier '5F3A', and a DFMULTIMEDIA has an identifier '5F3B', and a DFGRAPHIC has an identifier '5F50'.

Meanwhile, an EFDIR is a linear fixed file located below a MF, a kind of an application-independent file.

In FIG. 6, file identifiers for each DF are represented according to the above described reserved resources.

In the above described file structure, the PKI key information according to an example embodiment of the present invention may be included in a file structure of the eUICC as stored in a format of EF_eSIMPKI, an elementary file format.

More specifically, for example, the EF_eSIMPKI may be located below the DFTELECOM (having '7F10' as an file identifier), and have an file identifier '6F1X'. In the file identifier '6F1X' of the EF_eSIMPKI, 'X' may mean a value between '0' to 'F'.

However, a file structure of an eUICC or an eSIM according to an example embodiment is not limited to a specific example of FIG. 6. Other formats for storing necessary PKI key information (for example, a file structure such as TLV, or an application such as an applet) may be possible to be used.

According to the present invention which was described above, an efficient and safe management of an eUICC may become possible by utilizing PKI and key information about the PKI, which is generated statically in a manufacturing step of the eUICC or generated dynamically, during a procedure of issuing an eUICC in an environment of separated SM roles proposed in the GSMA.

As described above, since the technical idea of the present invention is described by exemplary embodiments, various forms of substitutions, modifications and alterations may be made by those skilled in the art from the above description without departing from of the present invention. Therefore, the embodiments disclosed in the pres essential features ent invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of managing key information of an embedded universal integrated circuit card (eUICC), performed in the eUICC interworking with external entities including a mobile network operator (MNO) system and a subscription manager (SM) system, the method comprising:
the eUICC performing a procedure of checking status and capability with at least one of the external entities;
the eUICC providing information about its status and capability during the procedure of checking status and capability, wherein the information about its status and capability is key information including information about at least one of a key generation algorithm, a key length, and a key generation manner,
wherein the MNO is separate from the SM system,
wherein the SM includes a subscription manager-data preparation (SM-DP) and a subscription manager-secure routing (SM-SR), the SM-DP encrypts the profile by using the public key of the eUICC, and the SM-SR encrypts the profile which is encrypted using the public key by using a separate management key so that the encrypted profile becomes a double ciphered profile, and
wherein the MNO separately communicates with the SM-SR and SM-DP via separate channels.

2. The method of claim 1, wherein the eUICC further includes profile access credentials for decrypting an encrypted profile received from at least one of the external entities, and the profile access credentials are a public key of the eUICC or a private key corresponding to the public key.

3. The method of claim 2, wherein the eUICC public key is generated in a manufacturing step of the eUICC, and stored in the eUICC.

4. The method of claim 2, wherein the eUICC public key is generated by the eUICC according to a request of the MNO system or the SM.

5. The method of claim 2, wherein the profile transmitted from the MNO system or the SM is a double ciphered profile, and the eUICC decrypts the encrypted profile by using a separate management key and decrypts the profile which is decrypted using the separate management key by using the public key of the eUICC.

6. The method of claim 2, wherein the key information is stored in the eUICC in a form of a profile.

7. The method of claim 6, wherein the key information is stored in the eUICC in at least one form among an elementary file (EF) form, a file structure form of tag, length, value (TLV), and an applet form.

8. A method of provisioning, performed in an embedded universal integrated circuit card (eUICC) system including a mobile network operator (MNO) system, a subscription manager (SM), and a eUICC interworking with the MNO system and the SM, the method comprising:
receiving, by the MNO system, PKI key information about a eUICC public key which can encrypt a profile from the eUICC;
encrypting, by the MNO system or the SM, the profile using the eUICC public key primarily; and
transmitting, by the MNO system, the encrypted profile to the eUICC,
wherein the SM is separate from the MNO system,
wherein the SM includes a subscription manager-data preparation (SM-DP) and a subscription manager-secure routing (SM-SR), the SM-DP encrypts the profile by using the public key of the eUICC, and the SM-SR encrypts the profile which is encrypted using the public key by using a separate management key so that the encrypted profile becomes a double ciphered profile, and
wherein the MNO separately communicates with the SM-SR and SM-DP via separate channels.

9. The method of claim 8, wherein the PKI key information includes information about at least one of a public key generation algorithm, a key length, and a key generation manner.

10. A method of changing MNO, performed in an embedded universal integrated circuit card (eUICC) system including a mobile network operator (MNO) system, a subscription manager (SM), and a eUICC interworking with the MNO system and the SM, the method comprising:
receiving, by a receiving MNO system, PKI key information about a eUICC public key which can encrypt a profile from the eUICC;
encrypting, by the receiving MNO system or the SM, the profile using the eUICC public key primarily;
notifying, by the receiving MNO system, a fact that an MNO is changed, to a donor MNO system, and being certificated, the donor MNO system being a previous system of the eUICC prior to a current MNO;
requesting, by the receiving MNO system, a second encryption to the SM by transmitting the primarily encrypted profile to the SM, and receiving a secondarily encrypted profile from the SM in response to the request; and
transmitting, by the receiving MNO system, the secondarily encrypted profile to the eUICC,
wherein the SM includes a subscription manager-data preparation (SM-DP) and a subscription manager-secure routing (SM-SR), the SM-DP encrypts the profile by using the public key of the eUICC, and the SM-SR encrypts the profile which is encrypted using the public key by using a separate management key so that the encrypted profile becomes a double ciphered profile,
wherein the MNO separately communicates with the SM-SR and SM-DP via separate channels.

11. The method of claim 10, wherein the PKI key information includes information about at least one of a public key generation algorithm, a key length, and a key generation manner.

12. An embedded universal integrated circuit card (eUICC) interworking with external entities including a mobile network operator (MNO) system and a subscription manager (SM) system, wherein the eUICC includes profile access credentials which can decrypt a profile transmitted from one of the external entities, and the eUICC provides key information which is information about its status and capability, and the key information includes information about at least one of a key generation algorithm, a key length, and a key generation manner, wherein the SM system is separate from the MNO system, wherein the SM includes a subscription manager-data preparation (SM-DP) and a subscription manager-secure routing (SM-SR), the SM-DP encrypts the profile by using the public key of the eUICC, and the SM-SR encrypts the profile which is encrypted using the public key by using a separate management key so that the encrypted profile becomes a double ciphered profile, and wherein the MNO separately communicates with the SM-SR and SM-DP via separate channels.

13. The eUICC of claim 12, wherein the profile access credentials are a public key of the eUICC or a private key corresponding to the public key.

* * * * *